United States Patent [19]

Treihaft

[11] Patent Number: 4,580,935
[45] Date of Patent: Apr. 8, 1986

[54] TIE DOWN SYSTEM

[76] Inventor: Michael T. Treihaft, 14335 E. Purdue, Moorpark, Calif. 93021

[21] Appl. No.: 577,165

[22] Filed: Feb. 6, 1984

[51] Int. Cl.⁴ .......................... B60P 3/06; B61D 3/18
[52] U.S. Cl. ................................ 410/3; 410/5; 410/7; 410/13; 410/23; 411/427; 411/910; 403/19
[58] Field of Search .............. 410/3, 9, 7, 10, 11, 410/12, 5, 13, 23; 411/910, 427; 403/19, 11, 386, 385, 400

[56] References Cited

U.S. PATENT DOCUMENTS

| | | | |
|---|---|---|---|
| 2,372,269 | 3/1945 | Golan | 411/910 X |
| 3,492,841 | 2/1970 | Irpi | 411/910 X |
| 4,155,678 | 5/1979 | Lehman et al. | 410/3 X |
| 4,257,644 | 3/1981 | Stephens | 410/12 X |
| 4,437,791 | 3/1984 | Reynolds | 403/386 X |

Primary Examiner—Robert B. Reeves
Assistant Examiner—Glenn B. Foster
Attorney, Agent, or Firm—Jack C. Munro

[57] ABSTRACT

Tie down system for a three wheeled motorcycle which uses a pair of securing plates in conjunction with tie down straps to be located about the axle which supports the rear wheels of the motorcycle and a spaced apart locking plate which utilizes a movable clamping bar to be tightly connected over a bracing bar mounted on the frame of the motorcycle.

3 Claims, 6 Drawing Figures

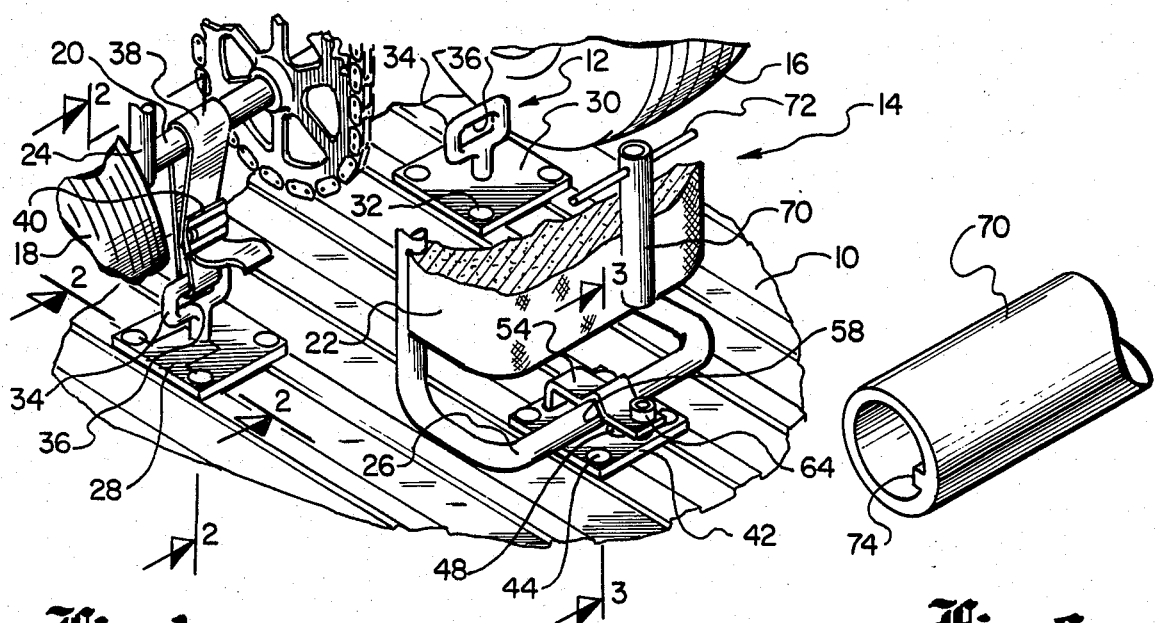
Fig.1.
Fig.6.
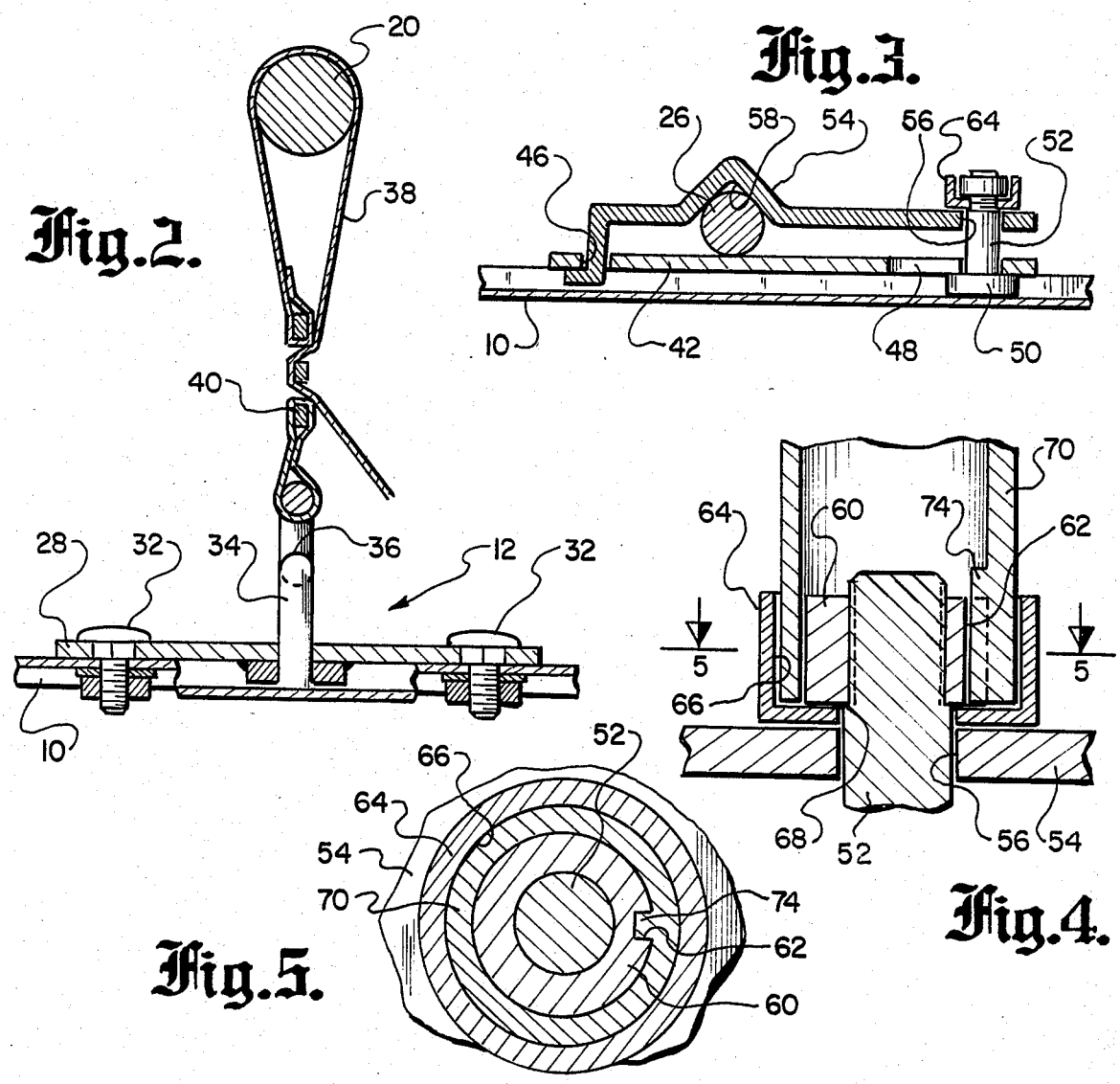
Fig.2.
Fig.3.
Fig.5.
Fig.4.

TIE DOWN SYSTEM

BACKGROUND OF THE INVENTION

The field of this invention relates to tie down systems and more particularly to a tie down system for a three wheel type of motorcycle.

A common recreational activity utilizes a three-wheeled motorcycle in off-road terrain. It is normally desirable to be able to transport this type of motorcycle to different off-road locations.

Typical transportation for such an off-road vehicle is a pickup truck. The bed of a pickup truck is adherently limited in size. It is quite common that it is desirable to transport two or more off-road vehicles to a particular off-road location. The typical size of the bed of a pickup truck can only accommodate a maximum of two of the off-road vehicles when the vehicle is merely set within the bed of the truck.

It would be desirable to construct some form of tie down system which could be utilized within the bed of the pickup truck so that three or maybe even four of these off-road vehicles could be transported within the bed of the truck.

SUMMARY OF THE INVENTION

The tie down system of the present invention is designed in particular to be mounted within the bed of a pickup truck although it is considered to be within the scope of this invention that the tie down system could be used in other environments. The tie down system uses three separate spaced apart mounting plates in the form of two identical securing plates and a single locking plate. The two securing plates are each to connect with a separate tie down strap. The securing plates are located at a position so that their respective tie down strap can readily wrap around the axle supporting the rear wheels of the off-road vehicle. The locking plate includes a clamping bar which is to be located about a bracing bar mounted just aft of the seat of the off-road vehicle. The clamping bar can be locked using a key actuated locking mechanism if such is desired. The secured position of the off-road vehicle is so that the vehicle is located in a substantially vertical position with the front wheel of the vehicle resting against the back surface of the cab of the truck. Within a typical pickup truck bed, a separate tie down system can be utilized or a second vehicle, a still further system used for a third vehicle and yet another system for even a fourth vehicle (if the bed of the truck is of sufficient size).

The primary objective of the present invention is to construct a tie down system which can be simply manufactured and can be installed within the bed of a pickup truck with minimum amount of skill.

Another objective of this invention is to construct a tie down system for a vehicle within the bed of a pickup truck which is relatively inexpensive.

Another objective of the tie down system of the present invention is to permit the mounting of three and possibly even four three-wheel type motorcycles within the bed of a single pickup truck.

BRIEF DESCRIPTION OF THE DRAWINGS

FIG. 1 is an isometric view of the tie down system of the present invention showing such mounted on the bed of a pickup truck with a three-wheel type of motorcycle being shown in phantom and secured by the tie down system;

FIG. 2 is a cross-sectional view taken along line 2—2 of FIG. 1 showing a securing plate and its associated tie down strap incorporated within the tie down system of the present invention;

FIG. 3 is a cross-sectional view taken along line 3—3 of FIG. 1 which shows in more detail the locking plate which is incorporated within the tie down system of the present invention;

FIG. 4 is a cross-sectional view through the suggested form of key operated locking device utilized in conjunction with the locking plate of the tie down system of the present invention showing the key connected to the locking mechanism;

FIG. 5 is a cross-sectional view taken along line 5—5 of FIG. 4; and

FIG. 6 is an isometric view of the operating end of the type of key which is utilized within FIG. 4.

DETAILED DESCRIPTION OF THE SHOWN EMBODIMENT

Referring particularly to the drawing there is shown a conventional bed 10 of a pickup truck upon which is mounted the tie down system 12 of the present invention. The tie down system 12 is to be utilized to securely mount a three-wheeled type of motorcycle 14 in position onto the bed 10.

The three-wheeled type of motorcycle 14 includes a pair of rear wheels 16 and 18 which comprise soft spongy tires. The rear wheels 16 and 18 are connected together and supported by an axle 20. The bike 14 also includes a seat 22. Seat 22 is attached to a frame 24. Part of the frame 24 is a bracing bar 26 which is mounted aft of and below the seat 22. The construction of the three-wheeled type of motorcycle 14 is deemed to be conventional and is pretty much standard between different manufacturers.

Fixedly mounted at precisely selected locations on the bed 10 are a pair of securing plates 28 and 30. Each of the plates 28 and 30 are primarily formed of sheet material and are substantially square in configuration. Each of the plates 28 and 30 are fixedly mounted onto the bed 10 by means of conventional bolt fasteners 32 with there being four in number of bolt fasteners 32 for each plate 28 and 30.

Centrally mounted within each of the plates 28 and 30 is a strap engaging means in the form of a T-shaped connecting rod 34. Each of the rods 34 includes an opening 36. A strap 38 is to be conducted through the opening 36 and wrapped about the axle 20. The strap 38 includes a conventional buckle assembly 40 which is to be utilized to tightly secure the strap 38 between the member 34 and the axle 20. As a result the rear wheels 16 and 18 of the bike 14 are tightly pressed in position onto the bed 10.

In order to prevent pivoting action of the bike 14, there is utilized a locking plate 42 which is mounted by conventional bolt fasteners 44 onto the bed 10 at a precisely selected location. Locking plate 42 includes an aperture 46 formed within the forward end of the plate 42 and elongated slot 48 formed within the aft end of the plate 42. The enlarged head 50 of a threaded fastener 52 (such as a bolt) is located between the undersurface of the plate 42 and the bed 10 and is confined in that position since the width of the slot 48 is less than the diameter of the head 50. However, because the slot 48 is elongated in the direction of the fore to the aft direction, the bolt 52 is capable of a limited amount of sliding movement in respect to the plate 42.

The fore end of the clamping bar 54 is to be locatable within the aperture 46 and, because of its right angled configuration, the bar 54 is held in position on the plate 42. The aft end of the clamping bar 54 includes a hole 56. Bolt 52 is to be conducted through the hole 56. Intermediate the fore and aft ends of the clamping bar 54 is a recess 58. The bracing bar 56 to be located within the recess 58 and is to be held tightly into position against the upper surface of the plate 42 as is clearly shown within FIG. 3 of the drawing.

Threaded outer end of the bolt 52 is to be connected with a nut 60. The nut 60 has a smooth exterior configuration with the exception of a groove 62. Mounted about the bolt 52 is a sleeve 64. The sleeve 64 is of at least of a height equal to the nut 60. Formed inwardly between the sleeve 64 and the nut 60 is an annular space 66. With the nut 60 tightened on the bolt 52 the nut 60 will abut shoulder 68 and the bracing bar 26 will be snugly held against the upper surface of the plate 42. The sleeve 64 is freely rotatable about the nut 60. Therefore, a special key 70 will be necessary in order to loosen the nut 60 with respect to the bolt 52 since any conventional pliers type of loosening tool that is applied to the sleeve 64 will merely cause rotation of the sleeve 64 and not loosening of the nut 60.

The key 70 includes a handle 72 at its outer end thereof. The body of the key 70 is basically cylindrical with its inner end including an internal key-way protuberance 74. The key-way protuberance 74 is to be located within the key-way slot 72. Manual torque being applied through the handle 72 to the key 70 will cause turning of the nut 60 with respect to the bolt 52.

It is considered to be within the scope of this invention that other types of key operated mechanisms could be utilized in conjunction with the locking plate 42 and the clamping bar 54.

What is claimed is:

1. In combination with a motorcycle having a fore end and an aft end, said motorcycle having a pair of rear wheels located at said aft end, said rear wheels being connected together by connecting axle, said connecting axle being mounted on a frame, said frame including a bracing bar located at said aft end, said bracing bar being spaced from said axle, a tie down system for said motorcycle, said tie down system to be mounted on a substantially horizontal supporting surface, normal operation of said motorcycle being when said bracing bar is spaced from said supporting surface, with said tie down system connected to said motorcycle said motorcycle assumes a tilted position with said bracing bar locating against said supporting surface, said tie down system comprising:

a pair of securing plates mounted on said supporting surface in a spaced apart relationship, each said securing plate including strap engaging means;

a tie down strap connected to each said strap engaging means with there being a separate said strap for each said securing plate, each said tie down strap being tightly wrapped about said axle; and a locking plate mounted on said supporting surface, said locking plate including locking means, said locking means being movable between an unlocked position and a locked position, said locking plate to connect with said bracing bar, with said locking means in said locked position said bracing bar being tightly held against said locking plate, said locking means including a clamping bar, said clamping bar being locatable on said bracing bar to hold said bracing bar against said locking plate when in said locked position, said clamping bar including a recess, said bracing bar to be located within said recess, said clamping bar being pivotally connected to said locking plate, said locking plate having an elongated slot, an enlarged headed fastener connecting with said elongated slot, said fastener being capable of lineal movement within said slot to provide adjustability during movement of said clamping bar between said locked position and said unlocked position, said clamping bar being connected to a locking mechanism.

2. The combination as defined in claim 1 wherein: said securing plates being identical in configuration.

3. The combination as defined in claim 2 wherein: said locking mechanism being actuatable by a key.

* * * * *